United States Patent [19]

Nöbl et al.

[11] Patent Number: 4,746,433
[45] Date of Patent: May 24, 1988

[54] PROCESS FOR THE ANAEROBIC TREATMENT OF ORGANIC SUBSTRATES

[75] Inventors: Ernst Nöbl, Reifgasse 4/10, A-3500 Krems a.d. Donau, Austria; Astrid Nobl, Donau, Austria

[73] Assignee: Ernst Nöbl, Krems a.d. Donau, Austria

[21] Appl. No.: 786,807

[22] PCT Filed: Feb. 12, 1985

[86] PCT No.: PCT/AT85/00003
§ 371 Date: Dec. 19, 1985
§ 102(e) Date: Dec. 19, 1985

[87] PCT Pub. No.: WO85/03695
PCT Pub. Date: Aug. 29, 1985

[30] Foreign Application Priority Data

Feb. 14, 1984 [AT] Austria .................................. 461/84

[51] Int. Cl.⁴ .............................................. C02F 3/28
[52] U.S. Cl. .................................. 210/603; 210/605; 210/617
[58] Field of Search ............... 210/616, 617, 603, 605, 210/608, 618, 622, 624–626, 630

[56] References Cited

U.S. PATENT DOCUMENTS

| 4,284,508 | 8/1981 | Jewell | 210/617 X |
| 4,505,819 | 3/1985 | Barnes et al. | 210/617 X |
| 4,532,042 | 7/1985 | Aivasidis et al. | 210/617 X |
| 4,626,354 | 12/1986 | Hoffman et al. | 210/616 X |
| 4,655,924 | 4/1987 | Heijnen | 210/603 |
| 4,664,803 | 5/1987 | Fuchs et al. | 210/603 |
| 4,696,747 | 9/1987 | Verstraete et al. | 210/603 |

FOREIGN PATENT DOCUMENTS

| 806655 | 4/1951 | Fed. Rep. of Germany . |
| 3302436 | 8/1983 | Fed. Rep. of Germany . |
| 553336 | 3/1923 | France . |
| 2162214 | 7/1973 | France . |
| 111401 | 11/1917 | United Kingdom . |
| 912433 | 12/1962 | United Kingdom . |
| 1491502 | 11/1977 | United Kingdom . |
| 2021550 | 12/1979 | United Kingdom . |
| 2059938 | 4/1981 | United Kingdom . |

Primary Examiner—Tom Wyse
Attorney, Agent, or Firm—Marmorek, Guttman & Rubenstein

[57] ABSTRACT

A process for the anaerobic treatment of organic substrates is disclosed. The substrate to be treated is mixed with biomass, then passed through a bed of filler bodies and sludge, and also, after separation of the gas formed, is introduced into a distribution chamber for the separation of any floating sludge particles from sludge particles that can deposit. The latter, if necessary, may be guided to a post-clarification device for the removal of sludge (biomass).

The apparatus for carrying out this process consists of a reactor comprising a buffer zone (14) limited by an inner cylinder (7), which buffer zone is connected to the distribution chamber (15) over the distribution impellers (6). Permeable intermediate membranes (16) and filler bodies (17) with a sludge bed (18) stored on top of them form the reaction chamber (19), which is separated by means of the compact intermediate layer (8) and siphon (10) from the distribution chamber (5) formed by the distribution cylinder (11) and connected by means of connecting lines (21). A periodically self-cleaning filter (65) pre-switched in the direction of flow to the discharge formed as an overflow groove (35) serves for the retention of the finest biomass corpuscules.

12 Claims, 3 Drawing Sheets

PROCESS FOR THE ANAEROBIC TREATMENT OF ORGANIC SUBSTRATES

This invention relates to a process for the anaerobic treatment of organic substrates, in solid or dissolved form, wherein the reaction products (for instance, $CH_4$, $CO_2$, biomass) are gathered and then discharged. In addition, it is an object of the invention to create an apparatus for carrying out such a process.

Equipment for the anaerobic treatment of organic substrates are known in the prior art. Here, basically two different purposes may be pursued, namely the origination of energy—in the form of methane gas—from organic substrates or the removal of organic substances in the sense of a purification of the added substrate. Although chemical and biological reactions are very similar, ultimately several standards of economy need be set as concerns supply and discharge which, in turn, affect the design and operation of the apparatus. An important feature in the anaerobic purification of waste water is the fact that here the major portion of the dissolved organic impurities is not removed by merely providing new cellular material as in aerobic waste water treatment, but that only a small portion is used for the installation of new cellular material, while the remaining carbonic compositions are converted into enriched gas—methane gas—and carbonic dioxide. Thus, in the anaerobic process no energy is needed to introduce the oxygen, as is required in the aerobic process for maintaining flow conditions. In addition, the amount of sludge collecting in the anaerobic process is substantially reduced and already fully stabilized. Another big advantage, especially where seasonal operations are involved, is the fact that the anaerobic sludge can be kept active for many months—even with no addition of substrate—and that it can be caused to become highly active in no time at all as soon as new amounts of substrate are added. However, the low biomass production also results in some disadvantages, exhibiting themselves in some problems in starting operation of the apparatus and in disturbances in the biological activity of the sludge. This, however, can in part be remedied not only by certain steps taken during construction, but also by the way of directing the process.

As already mentioned, anaerobic fermentation, for the major part, entails methane fermentation. By-products, such as hydrogen sulfide and ammonia, etc., are almost always formed—in different amounts—but will not be especially considered here. They are only important in some substrates where their accumulation exercizes a negative effect on the process or where their pollution of the gas detract from their usefulness. In the present state of science, methane fermentation is best carried out in the three-phase model of Bryant (1977), wherein in the first phase, the so-called hydrolysis fermentation, carbohydrates, fats and albumina are decomposed into volatile fatty acids and alcohols. The next phase entails the hydrogen and aceton-forming phase as well as fermentation into acetic acid, whereby the methane bacteria are activated. However, a level of acetic acid that is too high will result in the destruction of the bacteria so that it will be absolutely necessary to exercize precise control over the formation of acid. In the third phase, the splitting of the acetic acid, which results in reductive methane formation, concludes the process.

In methane fermentation commonly occuring in nature (in marshes, moors, the bellies of ruminants, etc.), such processes unfold closely one after the other. In order to utilize this process in an economical way, it was necessary to accelerate the methane fermentation process which under natural conditions unfolds but slowly. To create favorable marginal conditions, there were created a large number of different devices, the so-called anaerobic reactors, viewing optimum efficiency in the unfolding of the process.

Originally, observing the most favorable temperature as well as leading the new substrate to the bacteria were the most important parameters, but it was soon recognized that the velocity of flow could not be increased at will. Originally, it was assumed that a "pure culture" organism introduced in the process, such as the "bacillus methagenis", would ensure a disturbance-free unfolding of the process. But, it was soon recognized that it is not sufficient to merely establish the best conditions for the bacillus methagenis in order to have a disturbance-free process, but that still other reaction steps needed to be considered, of which methane formation represents but the "conclusion". This led to the discovery of the two-step model: the formation of acid and the formation of methane. These two phases, of course, unfold at different velocities. Prevalence of methane formation, and the therefrom resulting pH-displacement, exercizes a negative effect on the formation of methane, e.g. it inhibits, and on further uncontrolled unfolding of the process the methane-forming bacteria are destroyed. It was found that a pH-correction through the addition of lye influenced the process only for a short while, but did not basically change it. Therefore, an experiment was made to have the two main phases—formation of acid, formation of methane—transacted in separate reactors.

The known types of reactor designs can basically be divided into five different types, namely the classical reactor design, reactors for carrying out the contact process, the anaerobic filter, the sludge bed reactor, and the plug-flow reactor.

Classical Types of Reactor Designs

Among these, under our climatic conditions, we may classify the so-called sewage towers for anaerobic sludge stabilization in communal installations, as well as the small bio-gas plants of China, India, Taiwan, etc. The biggest problem is how to prevent the formation of surface scum and the accumulation of sediments on a large scale, and also short-circuit currents by the newly added substrate. Changing the geometry of the reactors offered some solutions. Parting from the cylindrical design, substantially more complicated egg-shaped, elongated geometrical forms were selected in order to obtain possibly small areas in the delicate zones. To prevent the formation of surface scum and the accumulation of sediments, as well as to obtain a thorough mixing of the contents of the reactor, thereby ensuring the mixing-in of the newly added substrate, the following methods may be used in the reactors:

stirring by applying gas via lancets into the fermenting mass;

revolution through stirring or mixing devices, such as screw scoops arranged inside the container;

revolution through displacement systems and, finally, revolution through pumps arranged outside the container.

Reactors for Carrying Out the Contact Process

These reactors were developed for the removal of organic, especially dissolved, substrates from waste water. They follow the system of the aerobic clarifying plants. The reactor consists of a stirring-boiler reactor and either an integrated or external sedimentation vessel in which separation of the mud-water mixture takes place. As the thus purified water is drained-off over a discharge channel, the mud is led back into the reaction area proper for increasing the active biomass. The content of dry substances in the mud led back generally is only a little higher than in the reactor itself, despite the fact that vacuum gasification may have been carried out or the sedimentation vessel been cooled off to prevent the further formation of gas which would hinder the deposition of the mud flakes. For this reason, there is but a reduced amount of active biomass per volume unit which, again, means that very large reactors are required. Another disadvantage is that from the start the substrate provided has to fill high requirements, in order to ensure a smooth unfolding of the process. Should there, for example, be other disposable organic substances in sizable amounts present in the in-flow, then it might be possible to set the reactor for the desired content in dry substances, but the portion of active biomass would, nevertheless, drop.

Anaerobic filters

The recognition that many biotechnological processes will only be successful if the participating organisms have a large enough surface to proliferate on led to the artificial affixation of these organisms onto carrier materials, for which purpose there were developed a series of carrier materials and immobilization processes. Through affixation of the organisms onto carrier materials, the flow of the process can in many cases be stabilized. The increased infiltration that occurs can only be traced back to the larger portion of active biomass per volume unit.

Attempts were made to employ the principle of carrier-fixed bacterial mass used in communal aerobic waste water technology—the so-called percolating filter devices—in an analogous way in the anaerobic range. The percolating filter device in a clarifying plant, in its simplest form, comprises a cylindrical container with a filling of porous carrier material on which the flora of micro-organisms proliferates. The waste water to be purified, cleared from the substances that were set off, is irrigated by special sprinklers and flows steadily from top to bottom over the film of organisms. The air flows in through the existing intermediate areas from the bottom to the top and so takes care of the oxygen supply. Through a reversal of the flow of substrate from bottom to top, all intermediate areas are filled with substrate; this halts air circulation and, in the absence of a supply of oxygen, the percolating filter becomes an anaerobic filter. For the filling, there may be used porous rocks, ceramic material or special synthetic filling bodies. The only aim is to obtain a usable surface as large as possible per unit volume. Substrate distribution occurs by means of a pipe system arranged on the floor of the reactor across the reactor cross-section. The path of the substrate can hardly be affected anymore because of the filling bodies resting on the floor of the reactor. There is a great danger of the formation of nests. By taking back part of the current being discharged, the substrate supplied can be thinned and thereby an average theoretical upward stream be obtained. This, however, cannot be raised at will since otherwise a stirring vessel characteristic with "obstacle" is obtained. At the lower part there could thus arise the risk that the areas between the filling bodies are partially displaced because of the inorganic substrates carried with the waste water, giving rise to "chimneys", i.e. to preferred stream passage channels. At the upper part, especially in devices that are located relatively high, there could result high gas-streaming velocities by reason of the gas formed at methane fermentation. The thereby arising considerable swirling effect may be a cause of the removal of film of organisms from the filler bodies.

Sludge Bed Reactors

The aggregation capacity of sludge observed in certain cases is a pre-condition for this type of reactor. In its simplest form, this may be a reactor that is traversed upstream, at whose lower range there develops high dry-substance concentration which gradually decreases upwards by reason of the good settling characteristics of the sludge. The already strongly mineralized sludge has more of a grain structure than the usual flaky structure. The substrate supplied from the bottom originates an upward current which corresponds to the settling velocity of the "sludge grains" in order to maintain a position of equilibrium. The thus obtained sludge filter has a high percentage of active biomass per volume unit which yields a large conversion rate and—as compared to other systems—results in a requirement for a substantially smaller reactor volume. Although the performance capacity of this type of reactor may be impressive when optimal conditions exist, the consequences of any disturbances may be disastrous. Already minor changes in the composition of the on-flowing current may change the behavior or the formation of the desired sludge structure. One consequence is that the settling characteristics in this case also vary, whereby the current equilibrium is lost. Such equilibrium also depends heavily on the amount of gas originated and the thereby resulting gas streaming velocity. Similarly to the anaerobic filter, uniform distribution across the entire cross-section constitutes a serious problem. To prevent too strong a mineralization of the sludge bed, the substrate supplied should contain only very reduced amounts of inorganic components. The return of a partial current of the discharge is also used as a means for controlling the process.

Plug-Flow Reactors

This type of reactor is appropriate to principally ferment a substrate with non-dissolved, e.g. solid particles; it is mainly used in areas where large herds of animals are kept to ferment manure with an admixture, and it is targeted to specific problems. As the name already indicates, there is here involved a type of reactor that does not intend a complete, thorough mixing of the substrate supplied with the contents of the reactor; rather, it passes the substrate supplied in a graft-like manner through the reactor. Here, there is mostly used a reactor which the current traverses in a horizontal sense. To destroy surface scum and loosen up suspended matter contained in the basic sludge, and also to make through-flowing possible, there is inserted a slowly revolving stirring or scraping mechanism. In the newer machines, a slightly inclined reactor is preferred. Similarly, one part of the discharge is led as a so-called "inoculation substance" into the supply, in order to shorten the staying time by reason of its higher content of active biomass. Another interesting variant arises when the reactor is subdivided into several segments and a partial, continuous feed of sludge (especially of backflow sludge) into the segments occurs.

While, as can be gathered by the above description, some designs (anaerobic filter, sludge bed reactor) can only be utilized in conjunction with a substrate free of solid matter, other types can also be utilized with substrates that contain solid organic components. Combination of these types can easily be effected, and has become traditional, but does not constitute a new type.

This invention has the object to improve flow conditions in a process of the aforementioned type by preventing disturbances on carrying out the process, like those that have been occurring heretofore, triggered by inorganic substances present in the in-flowing substrate, as well as preventing damage to the biomass. This aim is achieved in that the substrate to be treated by the method of this invention, if possible, after being first partially acidified, is mixed with biomass and then led through a sludge bed, wherein, if possible, part of the gas forming in the substrate is removed to reduce turbulence; that the substrate which had been in contact with the sludge bed is led into a distribution chamber for separation of those parts of sludge that can be precipitated under the influence of the law of gravity, wherein the floating particles are retained and the settling sludge parts are removed and, if possible, are subjected to a post-clarification process for removal of the sludge (biomass) from the water; and that the water is partially discharged and, if possible, oxygen is added to terminate the anaerobic process, while on the other hand, sludge is added as a biomass for mixing with the newly supplied substrate.

By the mode of carrying out the process in this invention, a heightening of the activity of the incoming substrate is achieved through mixing the substrate supplied with biomass. Its passing through the sludge bed triggers a reduction in organic weight, and the separation of the sludge from the substrate and then the renewed supply of the sludge at the start of the process makes possible the renewed utilization of the substrate, enriched with biomass, for increasing the activity of the incoming substrate. In this manner, the mode of carrying out the process provides for a substantial improvement in the anaerobic treatment of organic substrates, as compared to other known processes.

In another embodiment of the invention, the remaining portion of water containing reduced amounts of sludge is used for creating pressure stresses in the sludge to be mixed with the newly supplied substrate, the sludge being guided to the mixing zone and, if necessary, after the thus removed sludge, the water wherein reduced amounts of sludge still remain, is at least partially recycled into a post-clarification unit. This mode of carrying out the process allows one to use the remaining water, in a manner similar to a piston for creating pressure charges in the sludge to be mixed with the newly introduced substrate so that no further energy expenditure is necessary for creating movement within the sludge in the mixing zone. In this way, this mode of carrying out the process results in a special energy-saving procedure.

It is further provided that the gas forming out of the substrate as the sludge bed is traversed be at least partially introduced into the substrate in the distribution chamber for destroying any existing surface scum. Thereby part of the energy originating during the process itself is used to destroy surface scum; no additional supply of energy from the outside will be necessary for this purpose.

In an especially convenient mode of carrying out the process, it is provided that the substrate after being mixed with biomass is passed through a bed of filler bodies containing growths of biomass. By passing the substrate already enriched with biomass through the bed of filler bodies, the biomass growth on filler bodies will not be harmed by the incoming substrate, e.g., the activity in the bed of filler bodies is maintained. Here it would be recommendable that as the substrate is guided through the bed of filler bodies and the sludge bed, the filler bodies and the sludge bed are lifted counter to the force of gravity and are subsequently, following the force of gravity, be led to traverse the substrate as they settle down. This step will prevent the filler bodies in the bed from being baked into each other, thereby forming dead areas, or the sludge bed, under certain conditions, even experiences growth whereby passage of the substrate would be prevented.

The fact that the filler bodies are lifted as they stream through the substrate and on a settling movement traverse the substrate results in optimal guidance of the substrate to the bacterial mass.

The apparatus of this invention for carrying out the process comprises a reactor, into which there discharges a supply line for the substrate, and from which there leads off a discharge line for the substrate treated. Such an apparatus should be equipped in such a way that a optimal unfolding of the process within the reactor is ensured. For this purpose, according to this invention, it is provided that within the reactor there be arranged an inner cylinder, specifically concentrically, that this inner cylinder traverse a compact intermediate ceiling that covers the zone between the outer wall of the vessel and the inner cylinder, wherein the inner cylinder protrudes by its upper, open edge into the area between the intermediate ceiling and the shut-off covering of the reactor, and the inside compartment (buffer chamber) of the inner cylinder is in contact with the area above the bottom plate of the reactor, that there is further arranged in the reactor a drain to which the discharge line is connected, that the area below the intermediate ceiling is connected to the area above the intermediate ceiling over at least one connecting line which preferably traverses the intermediate ceiling, that in the area above the intermediate ceiling there is preferably arranged a distribution cylinder, into which the connecting line terminates. Such an arrangement makes it possible to cause substrate leaving the compartment below the intermediate ceiling over the connecting line to get into the compartment above the intermediate ceiling and, from there, into the inner cylinder, and through the same, again downward towards the bottom of the reactor, whereby an especially good mix of the substrate inside the reactor is achieved.

In another embodiment of the invention, it is provided that the drain, preferably formed as an overflow channel, be arranged between the shut-off covering and the compact intermediate ceiling, wherein the discharge of the supply line lies below the intermediate ceiling, and preferably inside the inner cylinder. Here, supply of the substrate below the intermediate ceiling is carried out in those cases where only reduced pre-acidification is desired. But, where a higher degree of burn-up is required, another embodiment of the invention provides that the drain, preferably formed as an overflow channel, be arranged in the compartment below the intermediate ceiling, wherein the discharge of the supply line will lie above the intermediate ceiling.

In another embodiment of the invention it is provided that the buffer compartment of the inner cylinder be in contact at its bottom over intermixing devices, which are preferably formed as channels limited by distribution impellers, with the area above the bottom plate of the reactor and that, if necessary, the bottom restriction of the channels be constituted by a distribution cone that protrudes from the bottom plate. By this measure it is achieved that the substance present in the buffer compartment, by means of the intermixing device, be not only added to the substance outside the cylinder in the reactor close to the bottom, but that it also be thoroughly mixed with the same. If distribution impellers are used, a spin may be applied to the substance leaving the inner cylinder during the mixing process, whereby a further improvement of the mixing operation can be obtained.

In an especially convenient embodiment of the apparatus of this invention, it can be provided that the upper edge of the inner cylinder protrudes into a siphon bell jar, wherein the area below the siphon bell jar is in contact below the upper border of the inside cylinder with the area above the intermediate ceiling. By this step, a temporary locking of the inside area of the inner cylinder from the area above the intermediate ceiling is obtained. This prevents a short-circuit stream from the inner cylinder toward the drain located in the area above the intermediate ceiling. On the other hand, the siphon bell jar will not prevent the sludge present above the intermediate ceiling to penetrate the inner cylinder during the mixing procedure and to be carried toward the bottom of the reactor through the inside cylinder.

In an especially useful embodiment of the apparatus of this invention, a control mechanism is provided underneath the siphon bell jar for influencing pressure. Through a corresponding steering of the pressure in the area underneath the siphon bell jar, the pressure developing underneath the siphon bell jar can be prevented from forcing its way into the area above the intermediate ceiling, there causing a swirling of the substrate, which would be counter to a settling movement of the sludge. Steering for influencing the pressure underneath the siphon bell jar can be achieved, in a special embodiment of this invention, by having a gas line preferably widening up at its discharge end into an area between the lateral wall of the inner cylinder and the siphon bell jar, beneath the lower edge of the inner cylinder; here, this line is in contact with a pressure source which in the discharge cross-section delivers a pressure corresponding to the maximum pressure beneath the siphon bell jar, and wherein, preferably, the source of pressure is the gas collecting beneath the intermediate ceiling and the second discharge of the gas line lies within the gas chamber.

In another embodiment of the invention, it is provided that a gas discharge pipe discharges into the siphon bell jar, preferably at the range of the highest point, which, preferably, is in contact with a gas dome whose ceiling is higher than the level of the drain leading out of the compartment above the intermediate ceiling. Here the gas discharge line makes it possible to reduce the pressure underneath the gas bell jar, which makes possible a streaming of substrate from the compartment above the intermediate ceiling in the inner cylinder so that the sludge will enter the inner cylinder from the top and force substrate out of the inner cylinder. Here the gas discharge line may also lead directly to a consumer or to an external gas storage. If the gas discharge line leads to a consumer, a locking mechanism must be arranged inside the same. Such locking mechanism should also be provided, if the gas discharge line is led through the area beneath the shut-off covering of the reactor. However, if the gas-discharge is led to an area below the intermediate ceiling, no locking mechanism need be provided in the line.

The automatic flow of the process can be further influenced from the outside if, in a further development of the invention, the gas-discharge line leading away from the siphon bell jar be in contact with the gas dome over a three-way valve connected to the pressure side of a pressure-raising blower which, on its suction side, is connected to the gas chamber, the area below the shut-off covering of the reactor and a gas-discharge line leading away from the reactor, wherein a locking mechanism, for instance a locking flap, is provided in the gas discharge line leading to the gas dome.

The gas formed while the process unfolds can be used to prevent the formation of surface scum in the distributing cylinder, if, in a special embodiment of the invention, a gas discharge line is made to discharge in the distribution cylinder arranged in the area above the intermediate ceiling, which line termines in an area below the intermediate ceiling at a level that is deeper than the upper edge of the inner cylinder, and wherein, if necessary, the discharge is formed off the end of a pipe widening up of the gas discharge line. In order that it not be necessary to form the covering between the lower edge of the siphon bell jar and the upper edge of the inside cylinder of too large a size, it can be arranged, according to a special embodiment of this invention, that the connecting line connecting the area below the intermediate ceiling to the area above the intermediate ceiling be provided with a steerable opening between its ends and in the area above the intermediate ceiling, but below the level of the drain (overflow channel), wherein, for steering, there is preferably provided a floating body by means of which the opening is locked at a changing fluid level.

If a continuous discharge from the reactor of the substrate treated is desired, another embodiment of the invention provides for arranging an outlet variable in height above the intermediate ceiling and below the level of the drain (overflow channel), which outlet is in contact with a discharge line, over a line preferably provided with a locking mechanism (locking flap).

In a further development of the invention, the discharge located below the intermediate ceiling of the connecting line which connects the area below the intermediate ceiling to the area above the intermediate ceiling is covered by gas traps. This step will ensure that only substrate and water, but not gas, is led to the area above the intermediate ceiling where post-clarification is to take place.

For improving the flow of the process, it will be useful—as already mentioned above—to make use of filler bodies on which biomass is grown.

In a further development of the invention, it is provided that at least one permeable intermediate bottom be provided below the interemediate ceiling that bridges the area between the vessel's outside wall and the inner cylinder, onto which bottom a bed of filler bodies can be deposited.

To keep turbulence in the area between the vessel's outer wall and the inner cylinder at a minimum, it is possible to provide, in a further development of the apparatus of this invention, that the intermediate bottom be arranged obliquely to the horizontal line and that alternating permeable and gas-tight segments for gas and fluid be provided on the surface.

To prevent sludge particles from reaching the drain, it can be provided in another embodiment of the apparatus of this invention, that a filter be located upstream of the drain, preferably formed as an overflow channel (in the flow direction).

To prevent ongrowth on the filter, it can be provided that the filter constitute the floor of a storage compartment located in the area above the intermediate ceiling, wherein the side walls of the storage compartment exceed the overflow level of the drain (overflow channel) arranged inside the storage compartment, so that the substrate to be filtered will on its way to the drain flow up the filter.

To ensure that the material to be filtered be supplied to the filter from a zone that already has minimal sludge, and thereby any stress on the filter be further reduced, it can be provided to arrange a loading chamber below the filter which is separated from the area above the intermediate ceiling by restricting walls, but can be connected to the area above the intermediate ceiling by means of check security devices provided with back-rinse openings, and that supply lines parting from the overflow device discharge into the area located below the filter, whose overflow level lies approximately at the same height as the overflow level of the discharge in the chamber restricted at the bottom by the filter.

The invention will now be explained in more detail, making reference to the drawings. The Figures show:

Figure 1:
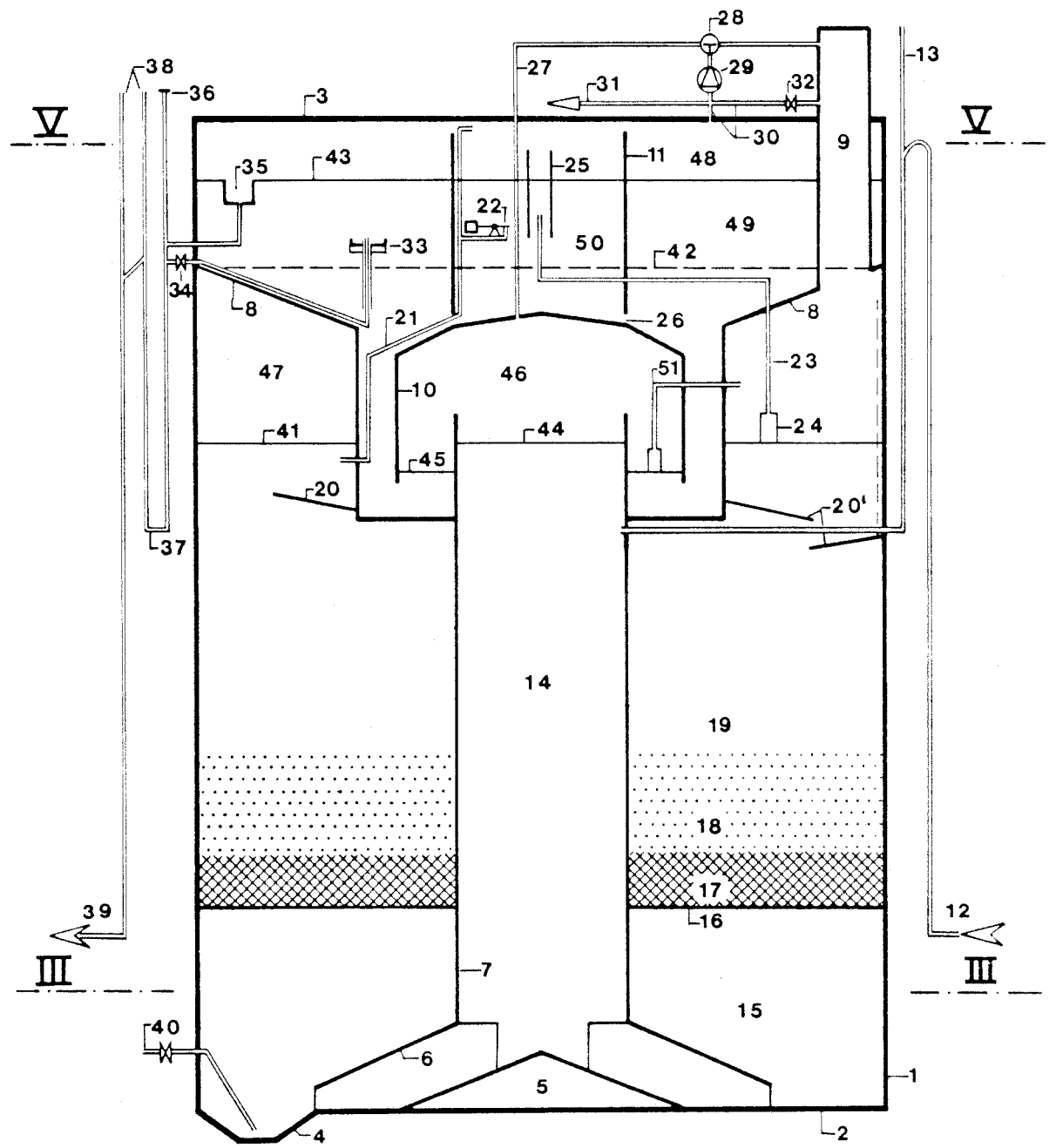
FIG. 1 is a longitudinal section through a first embodiment of the reactor of this invention, wherein the details provided immediately outside the median cut plane have been projected into the same.

The reactor comprises a cylindrical vessel outer wall 1, a planar bottom plate 2 and an equally planar locking plate 3.

The substrate to be treated, after being raised to the required processing temperature, reaches a buffer zone 14 separated from the rest of the reactor by an inner cylinder 7 over a supply line 12. The substrate present in the buffer zone 14 is pressed downwards against the bottom plate 2 and in this way reaches a distribution chamber 15 below a reaction chamber 19. The distribution chamber 15 and the reaction chamber 19 are separated from each other by a permeable intermediate ceiling 16. There may also be provided several intermediate ceilings at differing distances from each other. There may also be provided intermediate ceilings formed as casing cones. In this case the segment-shaped ranges of the casing cones can be kept free from perforations. Along these segments, the gas which collects below the cone-shaped intermediate ceiling may be directed onto the vessel's outer wall or the inner cylinder 7. During the mixing process, the newly arrived substrate present in buffer zone 14 reaches the distribution chamber 15 and forces out from the same an aliquota amount through the permeable intermediate ceiling 12 into the reaction chamber 19 located immediately above. If several intermediate ceilings are provided, the substrate gradually traverses the reaction chambers 9 located between these layers. On the intermediate ceilings 16, there are stored the filler bodies 17 which only partly fill the reaction chamber 19. Connecting lines 21 discharge into the reaction chamber 19, over which the substrate from reaction chamber 19 reaches the distribution chamber 50. The distribution chamber 50 constitutes part of a post-clarification chamber 49 which is separated from the reaction chamber 19 by a thick intermediate ceiling 8 which extends from the vessel's outer wall 1 into the inside cylinder 7. The distribution chamber 50 is in contact with the post-clarification chamber 49 over the passages 26 at the floor so that the substrate led to the distribution chamber 50 can flow into the proper post-clarification chamber 49. Here sedimentation now takes place. The substrate freed from suspended matter is collected in an overflow channel 35 arranged in the post-clarification chamber and leaves the reactor over discharge line 39 leading off the overflow channel 35. The portion still present in the post-clarification chamber 39, enriched with suspended matter, is led back to buffer zone 14 in a manner still to be described and, thus, returns to circulation.

A pump pit 4 is arranged on bottom plate 2, in which solid particles are collected and removed, together with the excess sludge and also the particles that cannot be decomposed, from the reactor over a ground drain 40.

At the bottom end of the inner cylinder 7, there are provided outside the inner cylinder 7 the distribution impellers 6 covered at the top, which serve to mix the amount of substrate stored in the distribution chamber 15 in a possibly uniform manner in a mixing step still to be described. A distribution cone 5 on bottom plate 2 serves to turn the vertical stream inside the inner cylinder around, in a manner so as to provide optimum streaming conditions, to flow horizontally. By the gradual narrowing of a cross-section in the passage between the covering of the distribution wings 6 and the distribution cones 5 or the bottom plate 2, a jet effect is obtained which, on the one hand, ensures a swirling of the ground sludge and, on the other hand, ensures rotational movement in the distribution chamber. Solid particles are gradually, in manner similar to the sedimentary material in rivers, moved on bottom plate 2, until they reach the pump pit 4 provided at a lower level where they can then be removed from the reactor through the bottom-discharge conduit. The amount, form, behavior and structure of the solid particles in the substrate are to be taken into consideration in the formation and arrangement of the distribution impellers 6.

The upper opening of the inner cylinder 7 is covered by a siphon bell jar 10 which by its lateral mantle extends into the area between the compact intermediate ceiling 6 and the cylinder mantle 7. Here, the compact intermediate ceiling 8 has a vertical wall part which is connected to the mantle of the inner cylinder 7 over a horizontal bottom part. A gas connecting line 27 leads from the siphon bell jar 10 into the gas chamber of a gas dome 9 which parts from the compact intermediate ceiling 8. A three-way valve 28 is provided in gas connecting line 27 to steer the gas promoted by a pressure-raising blower 29 from a gas chamber 28 into the post-clarification chamber 49.

There is provided a gas-connecting line 30 which is in contact with the suctioning side of the pressure-increasing blower 29 as well as with the gas chamber 48 of the post-clarification chamber, discharging into gas dome 9, wherein a gas-locking flap 32 is provided between the discharge opening of connection 30 in the gas dome and the branch-off on the suctioning side of the pressure-increasing blower 29.

A gas-discharge connection 31 is formed as a branch-off of gas-connecting line 30. Here, the gas-discharge connection 31 leads to the consumer or gas storage.

A gas-discharge line 51 leads out of gas chamber 46 below the siphon bell jar 10 into the gas chamber 47 of reaction chamber 19. The terminal of the gas-discharge line 51 in gas chamber 46 is provided with a widening 68. A gas-discharge line 23 leads off gas chamber 47 of reaction chamber 19 into the distribution chamber 50, there discharging into a vertical pipe 25, that both at the top and at the bottom is open in a sleeve-like manner so that on passage of the gas through the gas-discharge line 23 in tube 23 there is produced a lifting effect (mammoth lifter). The gas-discharge line 23 is provided at its terminal that discharges into the gas chamber 47 of reaction chamber 19 with a pipe widening 24.

In the post-clarification chamber there is provided a outlet 33 that can be varied, especially in regard to height, which, if necessary, may be provided additionally to overflow channel 35. A line leads from the variable outlet 33 to a siphon bell jar 37. A locking flap 34 is provided inside this line short of reaching siphon 37. Siphon 37 is pre-switched to the discharge line 39, wherein one of the siphon shanks constitutes an aeration elbow pipe, while the other siphon shank is also provided with a ceiling 36 leading into the open air (for cleaning purposes or the like). From one of the siphon shanks 37, there parts a connecting line to the discharge line 39 itself, which also is provided with an aeration elbow pipe 38, whose level lies above the locking ceiling 3 of the reactor.

The supply line 12 is provided with an aeration 13 to prevent drainage of the reactor whenever an underpressure should arise in the supply line 12.

A steerable opening 22 is provided in connecting line 21 leading from reaction chamber 19 into distribution chamber 50. Opening 22 is steered by floaters, wherein on rising fluid level in distribution chamber 50 opening 22 is closed.

Above the filler bodies 17 there is formed a sludge bed 18 which has been illustrated by a dotted line in the drawing. Sludge bed 18 may fill at maximum point the whole reaction chamber 19 (excluding, of course, the gas dome).

Gas traps 20 are provided in reaction chamber 19 in order to prevent the gas forming in reaction chamber 19 from penetrating into the connecting line 21 that leads from reaction chamber 19 into the distribution chambers 50. The gas traps 20 may also be formed as a ring 20' that parts from the vertical wall portion of intermediate ceiling 8 and, especially, be formed in a tapered-off manner outside the vessel outer wall 1. The edge of ring 20' facing the vessel outer wall 1 terminates at a distance from the vessel outer wall 1. A futher ring 20' may additionally be provided, whose inner edge is arranged below the first-mentioned ring 20', and which extends from the vessel outer wall 1 toward the inner cylinder 7, wherein between the free edges of ring 20' a passage is kept open.

Different fluid levels originating during the various phases of the process have been designated by the numerals 41–45. These individual phases of the process will still be discussed in more detail.

For an exemplification of the unfolding of the process, we may part from a given stage in the process; herein the individual characteristic procedual steps will be followed, which are described without taking into consideration the time it takes for them to unfold. Let us assume that a mixing operation has just been concluded and that a fluid level 42 has arisen in the post-clarification chamber 49, the reaction chamber 19 and the distribution chamber 50. Here the same gas pressure prevails in gas dome 9, gas chamber 48, the post-clarification chamber 49, the reaction chamber 19 and the gas-discharge line 31. The gas chamber 46 is filled with substrate. Conditioned by the position of fluid level 42, no discharge through discharge line 39 takes place. Temporarily, as required, there is also turned-off the supply over the supply line 12. Now the gas locking flap 32 in the gas-connecting line leading into the gas dome 9 that had been open during the mixing process is closed, the pressure-raising blower 29 is taken into operation, and the three-way valve 28 placed into the position 1, during which the path leading-off the pressure-raising blower 29 and also that leading into gas dome 9 as well as to siphon bell jar 10 is cleared. The gas now pressed over gas dome 9 into the chamber 19 forces the volume aliquot portion of the substrate therein over the permeable intermediate ceiling or intermediate ceilings 16, the distribution chamber 15, and the buffer zone 14 into the post-clarification chamber 49. The activity of the pressure-raising blower 29 is supported by the development of gas in reaction chamber 19 since the gas forming in reaction chamber 19 also collected at the impermeable intermediate ceiling 8. The fluid level 42 raises itself in the post-clarification chamber 49 in the direction of fluid level 43 and falls in reaction room 19 in the direction of fluid level 41, while in siphon bell jar 10 a gas chamber starts forming. In order to promote enlargement of this gas chamber, the three-way valve 28 is placed into the position II after a certain pre-determined time, i.e. it is changed in such a way that the whole gas stream now flows into siphon bell jar 10 over connecting line 27. This gas supply is maintained for as long as the fluid level below the upper edge of inner cylinder 7 falls. Thereby communication between the buffer zone 14 and the post-clarification chamber 49 is interrupted so that no substrate can now be forced from buffer zone 14 into post-clarification chamber 49. Thereby substrate can only be forced out of the reaction chamber 19 over the connecting line 21 into the distribution chamber 50 and, through the passages 26, into the post-clarification chamber 49. Now also the supply can be resumed. A short-circuit stream towards the discharge is no longer possible. As soon as this stage is attained, the pressure-raising blower 29 can be put out of operation. Gas formation, and thereby the origination of pressure in the reaction chamber 19 and in siphon bell jar 10, are not affected. The opening 22, steerable over the floaters, closes after the fluid level 42 exceeds the level of the floaters. A passage of fluid, at this point, is only possible over the top opening of connecting line 21. This opening is at a higher level than the overflow level of overflow channel 35 in order to free the sludge flakes, through the effect of the substrate flowing through the opening, which falls onto fluid level 43, from the gas bubbles attached to them, so that the sludge flakes settle down.

Different fluid levels 44 and 45 arise in siphon bell jar 10 as soon as the level of fluid below the upper edge of inner cylinder 7 has fallen off. In order to prevent a lowering of the fluid level 45 below the lower edge of the siphon bell jar 10, and thereby the flowing-out of gas from the siphon bell jar 10 into the neighboring chamber 49, an opening in the widening piece 68 of gas-discharge line 51 is provided over the lower edge of siphon bell jar 10. As soon as the level of fluid in the reaction chamber 19 reaches level 41, the gas streams out of gas chamber 47 of the reaction chamber 19 over the gas-discharge line 23 into the distribution chamber 50. As a result of the mammoth lifting effect thereby arising in pipe 25, there occurs a mixing in distribution chamber 50, which counteracts the formation of scum surfaces. Now, the three-way valve can be returned to position 1, which restores the connection between gas chamber 46 in siphon bell jar 10 and gas dome 9.

As soon as the highest fluid level 43 is attained in the post-clarification chamber 49, the still inflowing amount is led over overflow channel 35 to the discharge line 39 and leaves the reactor. The amount discharged is equal to the amount flowing in, increased by the amount corresponding to the gas formation in reaction chamber 19. As soon as the fluid level 41 is attained in the reaction chamber, the amounts forced into the individual function rooms correspond to the inflowing, and thereby also to the outflowing, amounts.

The next step now is the mixing of the newly supplied substrate of buffer zone 14 in distribution chamber 15. To this effect, the gas-locking flap 32 in the gas-connecting line 30 is opened. Within the now connected gas chambers 48 of the post-clarification chamber 49—where gas pressure is similar to that prevailing in gas-discharge line 31 and the pressure in gas chamber 47 of reaction chamber 19, and also in the gas chamber 46 below the siphon bell jar 10, where the gas pressure has been raised to the maximum pressure to correspond to the maximum difference in level—pressure is compensated by virtue of the connection with a gas storage or consumer. The fluid levels 44 and 45 that had arisen because of increased gas pressure start lifting themselves, until the chamber below the siphon bell jar is filled with substrate. Now connection among the post-clarification chamber 49, the buffer zone 14, the distribution chamber 15 and the reaction chamber 19 is reestablished. The volume of fluid resulting between fluid levels 42 and 43 whose amount corresponds to gas volume 47 can now reach through inner cylinder 7 over the distribution impellers 46 the distribution chamber 15 and, next, the reaction chamber 19. As this takes place, the gas from gas chamber 47 is displaced into the post-clarification chamber 49 (over gas-connecting line 30). At this point, fluid level 42 again occurs and after a closing of the gas-locking flap 32 the already described process unfolds anew.

The description, up to now, always referred only to one substrate since it is immaterial to the path of the substrate or the flow of the process whether substrates with purely dissolved organic components are involved or substrates containing solid substances. Similarly, up to now, we did not consider which object may be pursued with the anaerobic treatment of the substrate supplied, namely whether the apparatus will serve for obtentaining energy from organic substrates or for the removal of organic substances from the substrate for purification purposes. However, in the description of the individual ranges and the clarification of the concepts pertaining thereto, with the advantages that ensue vis-a-vis known devices, the objects above refered to need to be also considered. Thus, in the next paragraphs, we will also talk about purification devices or methane-yielding reactors. Here also the structure of the substrate is a decisive factor. A division into several classes, from strictly dissolved matter up to solid matter could be made, but would not be meaningful in view of the many possibilities. Thus, only the predominating structure will be considered.

In the aforedescribed reactor design, the substrate already passed through the reactor which has there been partially infiltrated with active sludge, as it reaches the buffer zone 14, by virtue of the added supply, is slowly moved downwards and, finally, forced out of inner cylinder 7. Depending on the structure of the added supply, hydrolization starts in buffer zone 14, e.g. a process already started before is rapidly continued, conditioned by temperature optimization. In substrates with easily decomposable, e.g. largely dissolved particles, an appreciable pH-displacement into the acid range may thereby be accomplished. However, since the active methane bacteria present in buffer zone 14 are slowly forced downward by the newly incoming substrate, they are not damaged by the acid environment formed since the same is formed in the upper part. It thus will also be possible to add a strongly acid supply without previous treatment, for instance neutralizing, to the reactor, provided they are organic acids. The buffer zone 14 limited by inner cylinder 7 will also be needed, in order to make it possible that in a mixing process any amount forced out from the upper range of reaction chamber 19 into the post-clarification chamber can penetrate the distributuion chamber 15 over the distribution impellers 6. If the unit is used for purification purposes, the buffer zone 14 limited by the inner cylinder 7 should not only constitute a connection to distribution chamber 15; rather, here it will be important to observe that the last portion which corresponds to the variable level difference between the fluid levels 42 and 43 in the post-clarification chamber 49 be stored in buffer zone 14. This is so, in order to make it possible to force this portion, which at this stage constitutes largely water separated from biomass, after termination of the mixing procedure, back into the post-clarification chamber 49, without enrichment by biomass. Thereby it is ensured that the output of biomass from the reactor over discharge 39 is kept at a minimum.

In the distribution room 5 there now occurs the first contact of the new supplied substance introduced into the reactor that had been stored in buffer zone 14 and been displaced with the there existing biomass. The mixing procedure, depending on the maximum difference of fluid levels 41 and 43 and the therefrom resulting maximum stream velocities, takes only a short time for the large passage cross-sections despite losses due to acceleration, off-turns and frictions. Thereby sudden, violent mixing is achieved. This almost shock-like mixing also makes it possible to mix in substrates whose organic acid content is way above the range in which methane bacteria can live. After this somewhat turbulent mixing step, a resting pause ensues, seen from a stream-technical viewpoint. At this point there occurs a certain separation due to the force of gravity. The substrate deriving from the post-clarification chamber 49 that had already been once before passed through the reactor and been mixed with biomass is forced out of buffer zone 14 in an amount equal to the new substance supplied. The streams originating during this step in distribution chamber 15 are relatively very small and, therefore, hardly disturb the settling process. There also does not occur any damage to the sludge because of local, e.g. concentrated or weak, mixing. The advantage of this kind of mixing vis-a-vis distribution of the supply over special pipe systems, in a form conventionally used in anaerobic filters and sludge bed reactors, is that a uniform distribution across the whole cross-section is ensured, and not over a greater or lesser number of point-shaped inlet openings across the cross-section. There is also avoided the risk of an uncontrolled, non-uniform distribution across the whole cross-section, either through clogging of the individual passage openings or change in the hydraulic resistances or similar reasons. In anaerobic filters and sludge bed reactors it also is possible for a damage to the active biomass to occur in the immediate discharge range by virtue of uncontrolled pH-displacement. This can also occur because of excess supply at one point and the therefrom resulting overstressing. This may result in killing the active mass in the immediate vicinity of the inlet passage, if this error is not early recognized and compensated. These "dead" zones enlarge themselves gradually, with time gradually leading to a breakdown in operations of the whole reactor.

The reaction chamber 19, as already mentioned, is separated from distribution chamber 15 by a permeable intermediate ceiling 16 and is partly filled with filler bodies 17, over which the sludge bed 18 is formed. The function of the permeable intermediate membrane 16 is to prevent the filler bodies 17 and the sludge bed 18 extending thereover from sinking further. In addition, the intermediate ceiling 16 must be formed in such a way that it poses relatively small resistance during the mixing step to the substrate streaming upwards. The filling bodies 17 have two primary tasks to fulfill, namely, to serve as carrier material for the biomass and to prevent, together with intermediate ceiling 16, a further sinking of the sludge bed 18 thereon. They should thus provide a possibly large surface for proliferation of the bacteria and fulfill the requirement to also lift themselves during the mixing process by virtue of the upwards streaming substrate and to partially participate in the upward movement. During the ensuing pause, a depositing of filler body 17 occurs triggered by the force of gravity. Here the substrate arising from the lower range is slowly traversed. The filling bodies 17 should be formed in such a way that their individual parts strongly differ from each other in regard to volume and that they also have different settling velocities. It is also important that the particles that settle most rapidly be large enough and it not be viable for them to fall through intermediate ceiling 16. In the settled state, the structure of the filler body should always become smaller upwards as concerns volume, until there next follows the sludge bed 18 and further sinking of the same is prevented. The advantage of these filler bodies 17 vis-a-vis the anaerobic filter is that the filler bodies, because of their lifting and ensuing settling, come into optimal contact during each mixing procedure with the substrate that serves as feed to the colony of bacteria; that no preferred stream-traversing channels are formed, and thus the whole mass of filler body uniformly participates in the process flow. The sludge bed over filler bodies 17 has the advantage of a high portion of active biomass per volume unit. Since before attaining the sludge bed 18 the supply of fresh substrate has already been subjected to several phases in the reactor, it is ideally prepared, and it will, therefore, as it traverses the sludge bed, not change its qualities substantially. Also the organisms released from the filler bodies 17 constitute large, freely floating colonies of bacteria which have a stabilizing effect on sludge bed 18. In purification plants which operate with mostly soluble and easily decomposable substrates, it is possible to install various compartments for individual functions to correspond to the selected active bacterial mass. Since, however, throughout the whole reactor a broad spectrum of bacteria, as before, remains present, the activity of such "specialists" can be restricted locally without any disadvantages arising therefrom. If conditions at the edges change and the one-time "specialists" become useless, then there only may occur certain displacements within the flow and less specialized bacterial species take over, without there occurring a breakdown of the entire process flow. The upper section of the reaction chamber 19 should be selected large enough so that its sludge level lies below connecting line 21 leading to distribution chamber 50.

By means of pipe widening 24 or 68, major oscillations are prevented from arising in the fluid levels 41, 43 or 44, 45. The gas present above the fluid always presses the level of the fluid slowly downwards. As soon as the lower edge of pipe widening 24 or 68 is attained, the surface tension becomes active and a further minimal sinking of the fluid level is possible. As soon as the first gas bubble breaks the surface tension and rises in the pipe, the equilibrium starts displacing itself in a shock-like manner. The strong gas current arising in the gas discharge line 23 or 51 now draws along parts of fluid and acts like a mammoth lifting lever. Although a static fluid counterpressure is available, without pipe widening 24 or 68, the process would only come to a halt after the level of fluid 41 or 45 has been considerably displaced upwards and that of level of fluid 43 been displaced downwards. Here the determining factor will be the difference between a static and a dynamic line of energy. Here, again, the latter will be influenced by the velocity of the current. The same is pre-set in the gas-discharge line 23 or 51 by the gas overpressure in gas chamber 47 of reaction chamber 19 or in gas chamber 46. Based on conditions of continuity, the current velocity in pipe widening 24 or 68 is smaller proportionally to the cross-sections. Thereby, with the right dimensions, it is possible to reduce the level of oscillations to the desired minimum.

The distribution chamber 50 is formed in such a way that no large forced currents flowing downwards will originate in it, which could drag along light, thus not depositable sludge portions, and move them to the post-clarification chamber.

For purposes of a comparison of the amounts discharged, there is withdrawn over drain 33, which is variable in height to correspond to the fluid level, a portion of the substance. As soon as discharge of the substrate over the fixedly mounted overflow channel 35 started, a locking of the locking flap 34 sets out of operation the hydraulically more unfavorable variable drain 33.

If there is no purification plant involved, and thus a continuous discharge of sludge particles is effected and the post-clarification chamber 49 serves more for biomass enrichment than for storing the required volume of mixing substance, then the distribution cylinder 11 is not used, and the already mentioned method of scum float destruction across the whole surface of the substrate is carried out in the post-clarification chamber 49. There also may be used an especially formed overflow funnel instead of the long overflow channel 35. Siphon 37 in the discharge line 39 serve for locking off the gas. The pipe sockets prevent siphon 37 which constitutes a safety device for the gas lock from being suctioned off by a lifting effect. By means of this aeration sockets 38 as well as the formation of the discharge line 39, it is ensured in purification plants that a possibly high addition of oxygen into the discharging substrate take place. This addition of oxygen prevents an unwarranted continuation of the anaerobic process and creates the possibility of origination of an aerobic environment.

In purification plants it is possible to introduce variations in a sense that the post-clarification chamber 49 be no longer used as such, but the freshly introduced substrate be guided into it in order to achieve more complete pre-acidification. In this case, the last, compact intermediate ceiling 8 can be made horizontal, and the inner cylinder 7 will no longer serve to separate the buffer zone 14, but merely as a connecting channel to distribution chamber 15. The substrate forced out of reaction chamber 19 below the intermediate ceiling will now correspond to the discharge and now also will be directly introduced in the same. To prevent the output of sludge, it will be convenient to install an overflow device in the reaction chamber 8 to correspond to the fluid level. By installing a filter ceiling floating on the fluid level, an undesired high output of sludge with the discharge will be prevented.

Figure 2:
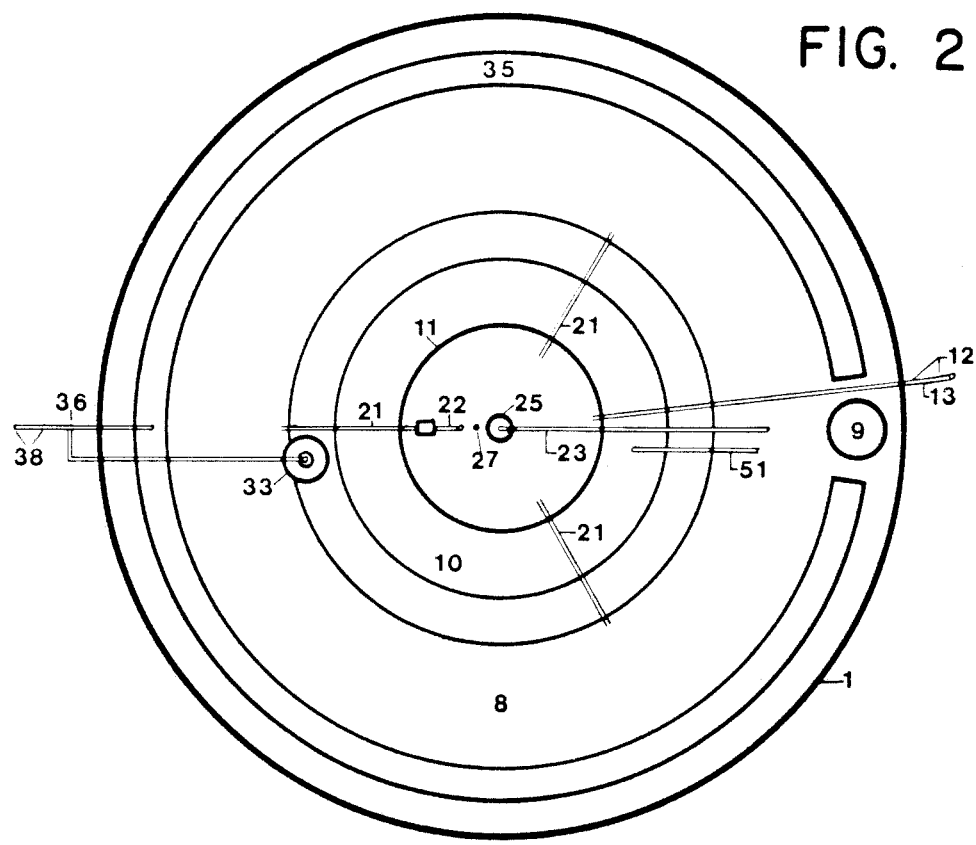
FIG. 2 is a top view of the reactor, when the ceiling is removed.
Figure 3:
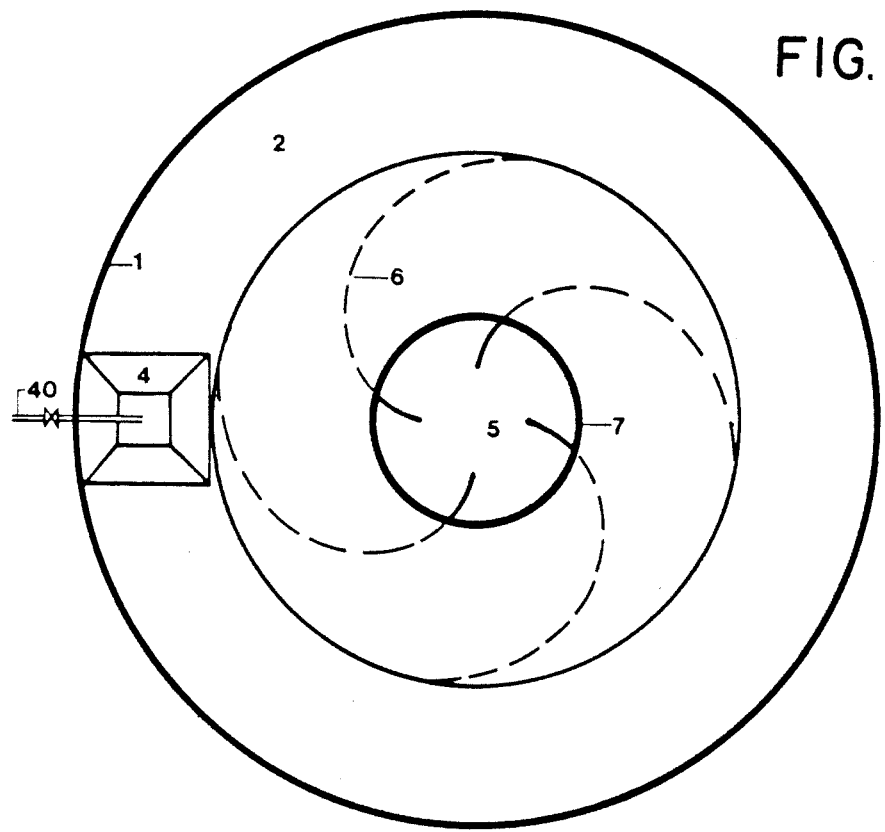
FIG. 3 is a section along line III—III in FIG. 1.
Figure 4:
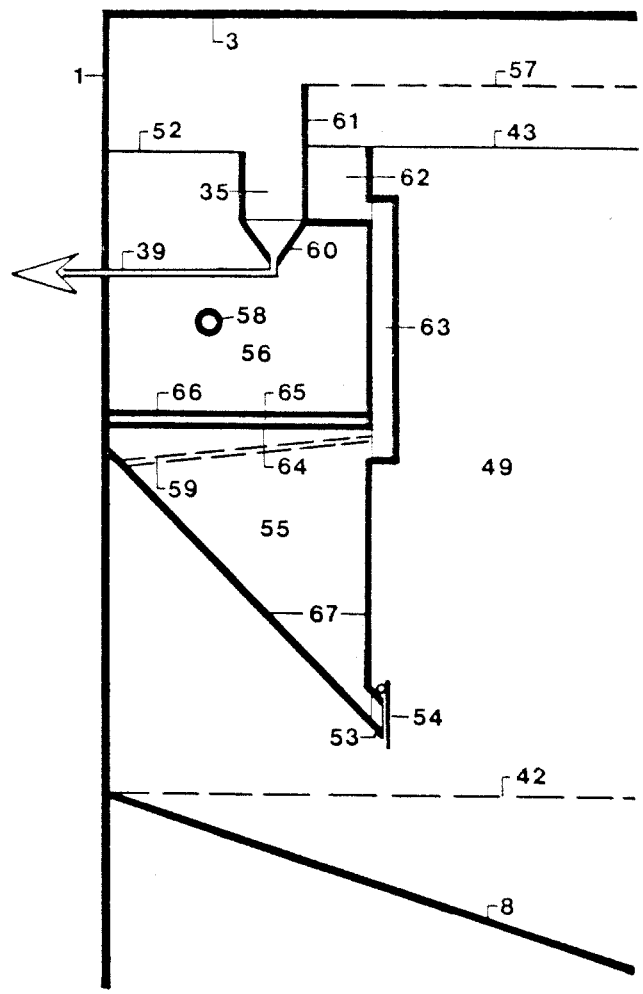
FIG. 4 is a longitudinal section through a second embodiment of the reactor of this invention.
Figure 5:
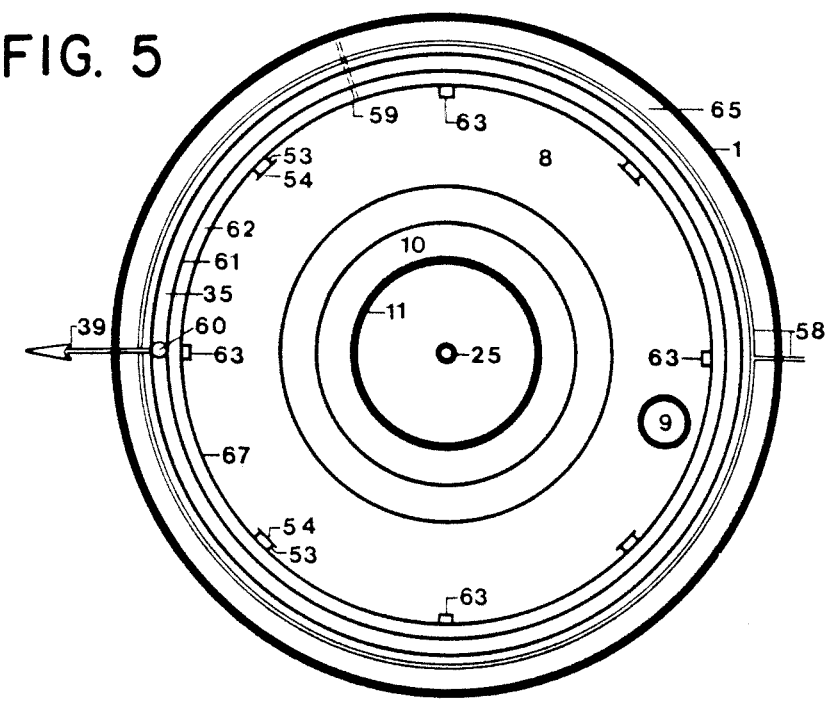
FIG. 5 is a top view of the reactor illustrated in FIG. 4 with top removed.

The filter device illustrated in FIGS. 4 and 5 can be inserted in a reactor according to FIGS. 1–3, in the range of the overflow channel 35 above the compact intermediate ceiling 8. The other parts of the reactor remain the same.

The apparatus consists of an additional overflow channel 62 adjoining overflow channel 35 on one side, the supply lines 63 in a preparation room 55 with the back-rinse openings 53 below the plane of filter 65 that lead into the post-clarification chamber 49. Above filter 65 there is a storage room 56 for the back-rinse.

The sludge-water mixture to be filtered, after reaching level 43, flows into the overflow groove 62, from whence it flows over the supply lines 63 into the preparation room 55. From here the sludge-water mixture is guided through the horizontally arranged cross-section of filter 65 that forms the ceiling of preparation room 55. After filling up the storage chamber 56 above filter 65, the water now freed from sludge can now flow over overflow channel 35 and over inlet funnel 60 to the final discharge line 39. The enrichment of sludge at the underside of the filter increases filter resistance. This causes the water level to rise above level 43. In order to prevent destruction of cylinder 65 by the increased pressure resulting from a rise in the water level, an emergency-overflow device 61 is directly connected to the overflow groove 35. After the water has attained a maximum level (level 57), predetermined by the upper border of the emergency-overflow device 61, there occurs an overflowing into overflow groove 35.

To clean filter 65, advantage is taken of the stroke-like drop of the fluid level from level 43 that occurs at the introduction of the mixing phase in the reactor. Here, the fluid level in the reactor drops down to a minimum level 42 in the post-clarification chamber 49.

The sludge-water mixture existing in distribution chamber 55 flows out over back-rinse opening 55 as suddenly out of preparation room 55. The fluid existing above filter 64 in the storage chamber 56 flows in like manner to backflow opening 53 and, by virtue of its high velocity, drags along the sludge portions adhering to the underside of the filter. Filter 65 can additionally be cleansed with fluid which is guided through the jets 58 arranged above filter 65 onto the upper face of filter 65. Filter 65 is placed on supports 64 and prevented from floating by the further supports 66.

The backflow openings 53 are provided with a backlash safety device 54. This makes a slow filling of the filter device possible (preparation chamber 55 and storage chamer 56) during a rise of the level of flduid from level 42 to level 43. Thereby the static stress within the filter device is kept as small as possible. After the fluid level has reached level 43, the backflow safety device 54 will prevent substantial amounts of water-sludge arriving from the zone of the back-rinse opening 53 from penetrating into the preparation chamber 55.

Since the aforedescribed filter device, as a rule, will extend over the whole outer wall of the reactor, a gas line 59 open on both sides which traverses the limiting wall 67 is provided by which the sludge-water mixture can also be fed to the zone below the limiting wall 67 of preparation chamber 55.

We claim:

1. A process for the anaerobic treatment of fluids containing organic substrates, comprising
   mixing an organic substrate with biomass;
   passing a rising flow of said substrate and said biomass through a bed of filler bodies to which a sludge bed is attached,
   lifting said filler bodies and said sludge bed upward counter to the force of gravity;
   allowing said filler bodies and said sludge bed to settle downward under the influence of gravity;
   traversing a portion of said rising substrate through said filler bodies and said sludge bed as said filler bodies and said sludge bed settle downward;
   separating settled sludge from floating sludge under the influence of gravity;
   removing said settled sludge;
   partially discharging fluid associated with said floating sludge; and
   recycling said remaining sludge by mixing said sludge with newly introduced substrate.

2. The process of claim 1 further comprising subjecting the organic substrate to partial acidification prior to mixing said substrate with said biomass.

3. The process of claim 1 further comprising removing at least a portion of gas produced after said substrate is passed through said sludge bed.

4. The process of claim 1 further comprising leading said substrate which has been in contact with said sludge bed into a distribution chamber.

5. The process of claim 1 further comprising subjecting said floating sludge to a post-clarification process for the separation of said biomass from fluid associated with said floating sludge.

6. The process of claim 1 further comprising adding oxygen to terminate the anaerobic process after said fluid associated with said floating sludge has been discharged.

7. The process of claim 1, further comprising utilizing the remaining portion of said fluid containing reduced amounts of said sludge for creating pressure stresses in said sludge, mixing said sludge with newly introduced substrate.

8. The process of claim 7, further comprising recycling at least a portion of said fluid in which reduced amounts of sludge still remain into a post-clarification unit.

9. The process of claim 1, further comprising introducing at least a portion of said gas which has been removed into said distribution chamber for destroying surface scum.

10. The process of claim 1, further comprising passing said substrate through a bed of said filler bodies having growths of biomass.

11. The process of claim 10 wherein said filler bodies include individual parts, further comprising forming said filler bodies so that said individual parts differ from each other in regard to volume and settling velocity.

12. The process of claim 11, further comprising providing a structure of said filler bodies which has a smaller volume in an upward direction.

* * * * *